US012736161B1

(12) United States Patent
Jaffari

(10) Patent No.: US 12,736,161 B1
(45) Date of Patent: Sep. 15, 2026

(54) NONMETALLIC CONDUIT FITTING

(71) Applicant: ABB Schweiz AG, Baden (CH)

(72) Inventor: Andy Ali Jaffari, Bartlett, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 19/192,713

(22) Filed: Apr. 29, 2025

(51) Int. Cl.
*F16L 33/22* (2006.01)

(52) U.S. Cl.
CPC .................................. *F16L 33/224* (2013.01)

(58) Field of Classification Search
CPC ...... F16L 33/224; F16L 33/222; F16L 33/223
See application file for complete search history.

(56) References Cited

U.S. PATENT DOCUMENTS 996,114 A * 6/1911 Muller .................. F16L 33/222 285/383
2,321,260 A * 6/1943 Stecher ................. F16L 33/224 285/341
3,659,880 A * 5/1972 Goldsobel ............. F16L 33/222 285/248
4,033,614 A * 7/1977 Hanson ................. F16L 33/224 285/248
4,162,802 A * 7/1979 Cox ........................ F16L 19/10 285/382.7
4,666,190 A * 5/1987 Yamabe ................ F16L 33/222 285/248
4,705,304 A * 11/1987 Matsuda ............... F16L 33/222 285/248
4,900,068 A * 2/1990 Law ...................... F16L 33/222 285/139.2
10,851,926 B2 * 12/2020 Shemtov ................. F16L 33/24

FOREIGN PATENT DOCUMENTS

JP 2013036503 A * 2/2013 ............. F16L 25/01

* cited by examiner

*Primary Examiner* — David Bochna
(74) *Attorney, Agent, or Firm* — Fitch Even Tabin & Flannery LLP

(57) ABSTRACT

A system and method for attaching a free end of a liquid-tight flexible nonmetallic conduit (LFNC) Type A to a fitting, includes threading a gland nut onto the free end of the conduit; pushing the free end of the conduit into a cylindrical section of the fitting until the free end of the conduit abuts an annular flange; and engaging a threaded section of the fitting with the gland nut, and tightening the gland nut until the gland nut abuts a body of the fitting; wherein tightening the gland nut creates a water-tight and resistance to pull the conduit away from the body interface between a channel in the cylindrical section and the conduit as fingers of the fitting are urged and bite into the conduit axially at the channel.

13 Claims, 7 Drawing Sheets

NONMETALLIC CONDUIT FITTING

FIELD OF THE DISCLOSURE

The present disclosure generally relates to electrical connection equipment and, more particularly, to a conduit fitting for use with type-A nonmetallic conduit.

BACKGROUND OF THE INVENTION

Electrical conduits are tubes used to route and protect electrical wiring in a building or other structure. Different types of conduits include metallic or nonmetallic conduits, flexible or solid conduits, and the like. Conduits are also connected to various electrical distribution structures such as other runs of conduit, bends, fixtures, junctions, cabinets, and the like, using various types of connectors. These connectors provide a structural support of the conduit and also fulfil other requirements such as resisting pull out forces, providing water tight conditions, and the like.

One specific type of conduit is referred to in the market as Type-A Nonmetallic Conduit, and also liquid-tight flexible nonmetallic conduit (LFNC) Type A. The National Electrical Code (NEC) 2020 describes liquid tight nonmetallic conduit (LFNC) as a raceway of circular cross section having a smooth, seamless inner core and cover bonded together and having one or more reinforcement layers between the core and covers, which is designated as LFNC-A. In one iteration, LFNC-A conduit, Type CNP, has a smooth inner wall PVC core covered with a nylon fiber braid bonded to a smooth, oil resistant PVC cover. Type-A fittings must be used due to the thick wall of the conduit. A known type of a fitting 100 is shown in FIG. 1 for illustration. The fitting 100 is configured to connect to an end 102 of a section of conduit 104, which in this case is LFNC-A conduit. The fitting 100 includes a body 106 that includes a left-handed, thread section 108 onto which an inner-diameter of the end 102 engages and is threaded onto the body 106. A gland nut 110 is threaded onto a nut-threaded section 112 of the body 106 and is appropriately sized internally to compress the conduit 104 onto the thread section 108 to secure the conduit onto the body 106 and to provide a liquid-tight connection therebetween. The body 106 further includes a hex section 114 disposed adjacent a channel 116 and seal 118 for sealably engaging a wall 120 of an enclosure through an opening, onto which the body can be secured using a nut 122 threaded onto a mounting section 124, as shown in FIG. 1.

During assembly, the body 106 is removed to permit its installation and turning to secure the conduit 104 onto the thread section 108. The body 106 may then, as a second step, be secured to the conduit 104 using gland nut 110 and to the wall 120 using the nut 122. As can be appreciated, assembly or disassembly of the conduit 104 onto the fitting 100 requires removal of the fitting 100 from the wall 120 each time due to the rotational threaded engagement necessary between the fitting 100 and the conduit 104.

As is known in the industry, only Type A fittings such as the fitting 100 provide a liquid tight connection on Type A conduit such as the conduit 104. In contrast to Type A conduit, Type B conduit has a smooth inner surface with integral reinforcement within the raceway wall, designated as LFNC-B. This type of conduit has smooth inner and outer PVC walls with a co-extruded reinforcing PVC coil. Type B fittings must be used on this type of conduit due to the reinforcing coil, which constrains flexibility of the circular cross section, while the conduit is flexible along its length.

As shown in FIGS. 2*a* and 2*b*, a Type B conduit fitting 200 includes a body 202 that forms a lead-in portion or center tube 204 that slidably and sealably accepts an inner diameter of a LFNC-B section of conduit (not shown). The center tube 204 is inserted into the conduit's core and a gland nut 206 tightens a grip of fingers 208 having protrusions 210 formed thereon that surround the conduit and that are pushed radially inwardly as the gland nut 206 is tightened. As is known, only Type B fittings provide a liquid tight connection on Type B conduit, but not Type A conduit, and for this reason Type A and Type B fittings are not used interchangeably on Type A conduit. This is because Type A conduits are compliant internally and there is no feature on the center tube 204 to deform the internal material of the Type A conduit to provide a liquid tight seal and/or resistance to a pull out force—these functions on the Type A conduit are provided by the thread section 108 that positively engages the conduit.

In view of the foregoing, it can be appreciated that existing fittings do not permit the assembly or disassembly of Type A conduit onto its fitting in a way that a provides liquid tight connection that also includes pull out resistance, without having to remove the fitting from the component or structure in which it is connected.

BRIEF SUMMARY OF THE INVENTION

In one aspect, the present disclosure describes a fitting for liquid-tight flexible nonmetallic conduit (LFNC) Type A, comprising a body having an axis and including a threaded section; an annular flange disposed perpendicular relative to the axis; a cylindrical section having an inner surface and an outer surface, the cylindrical section being connected to the annular flange and extending directionally away from the body along an inner periphery of the annular flange; a plurality of fingers connected to the annular flange and extending in a direction away from the body along an outer periphery of the annular flange, the plurality of fingers generally defining a cylindrical feature that extends generally in parallel to the cylindrical section and at a radially offset distance therefrom to define a radial gap; wherein each finger of the plurality of fingers includes a protrusion at a distal end thereof, the protrusion facing the cylindrical section and extending into the radial gap; and wherein a channel is formed in the outer surface of the cylindrical section, the channel extending perpendicular to the axis peripherally around the cylindrical section, the channel being axially aligned with the protrusions of the plurality of fingers in an axial direction; and a gland nut being engageable on the threaded section of the body, the gland nut including an inner conical surface that opens in the axial direction towards the body; wherein the inner conical surface is configured to engage the plurality of fingers as the gland nut is threaded onto the threaded section, and to urge the distal ends of the plurality of fingers towards the channel of the cylindrical section as the gland nut threadably advances towards the body; and wherein a section of conduit is adapted to occupy the radial gap and abut the annular flange such that, when the plurality of fingers is urged towards the cylindrical section, the protrusions bite into an outer surface of the conduit and urge a portion of an inner surface of the conduit to enter the channel and create a water-tight interface.

In another aspect, the present disclosure describes a method for connecting a free end of a liquid-tight flexible nonmetallic conduit (LFNC) Type A to a fitting, comprising: providing a body having an axis and including: a threaded section; an annular flange disposed perpendicular relative to the axis; a cylindrical section having an inner surface and an outer surface, the cylindrical section being connected to the annular flange and extending directionally away from the body along an inner periphery of the annular flange; a plurality of fingers connected to the annular flange and extending in a direction away from the body along an outer periphery of the annular flange, the plurality of fingers generally defining a cylindrical feature that extends generally in parallel to the cylindrical section and at a radially offset distance therefrom to define a radial gap; wherein each finger of the plurality of fingers includes a protrusion at a distal end thereof, the protrusion facing the cylindrical section and extending into the radial gap; wherein a channel is formed in the outer surface of the cylindrical section, the channel extending perpendicular to the axis peripherally around the cylindrical section, the channel being axially aligned with the protrusions of the plurality of fingers in an axial direction; providing a gland nut onto the conduit, the gland nut being is engageable on the threaded section of the body, the gland nut including an inner conical surface that opens in the axial direction towards the body; wherein the inner conical surface is configured to engage the plurality of fingers as the gland nut is threaded onto the threaded section, and to urge the distal ends of the plurality of fingers towards the channel of the cylindrical section as the gland nut threadably advances towards the body; wherein a section of conduit is adapted to occupy the radial gap and abut the annular flange such that, when the plurality of fingers is urged towards the cylindrical section, the protrusions bite into an outer surface of the conduit and urge a portion of an inner surface of the conduit to enter the channel and create a water-tight interface; pushing an end of the conduit onto the cylindrical section until the end of the conduit abuts the annular flange; and threading the gland nut onto the threaded section of the body until the gland nut abuts the body.

In yet another aspect, the present disclosure describes a method for attaching a free end of a liquid-tight flexible nonmetallic conduit (LFNC) Type A to a fitting, comprising: threading a gland nut onto the free end of the conduit; pushing the free end of the conduit into a cylindrical section of the fitting until the free end of the conduit abuts an annular flange; and engaging a threaded section of the fitting with the gland nut, and tightening the gland nut until the gland nut abuts a body of the fitting; wherein tightening the gland nut creates a water-tight interface between a channel in the cylindrical section and the conduit as fingers of the fitting are urged and bite into the conduit axially at the channel.

BRIEF DESCRIPTION OF THE SEVERAL VIEWS OF THE DRAWING(S)

FIG. 1 is an exploded view of a known Type A fitting.

FIG. 2*a* is an exploded view of a known Type B fitting.

FIG. 2*b* is a section view of a known Type B fitting.

DETAILED DESCRIPTION OF THE INVENTION

The present disclosure is generally directed to a fitting for a Type A conduit that permits the liquid-tight and pull-resistant connection to the Type A conduit without having to remove the fitting from its existing position, by eliminating the threaded connection between the conduit and the fitting.

Figure 3:
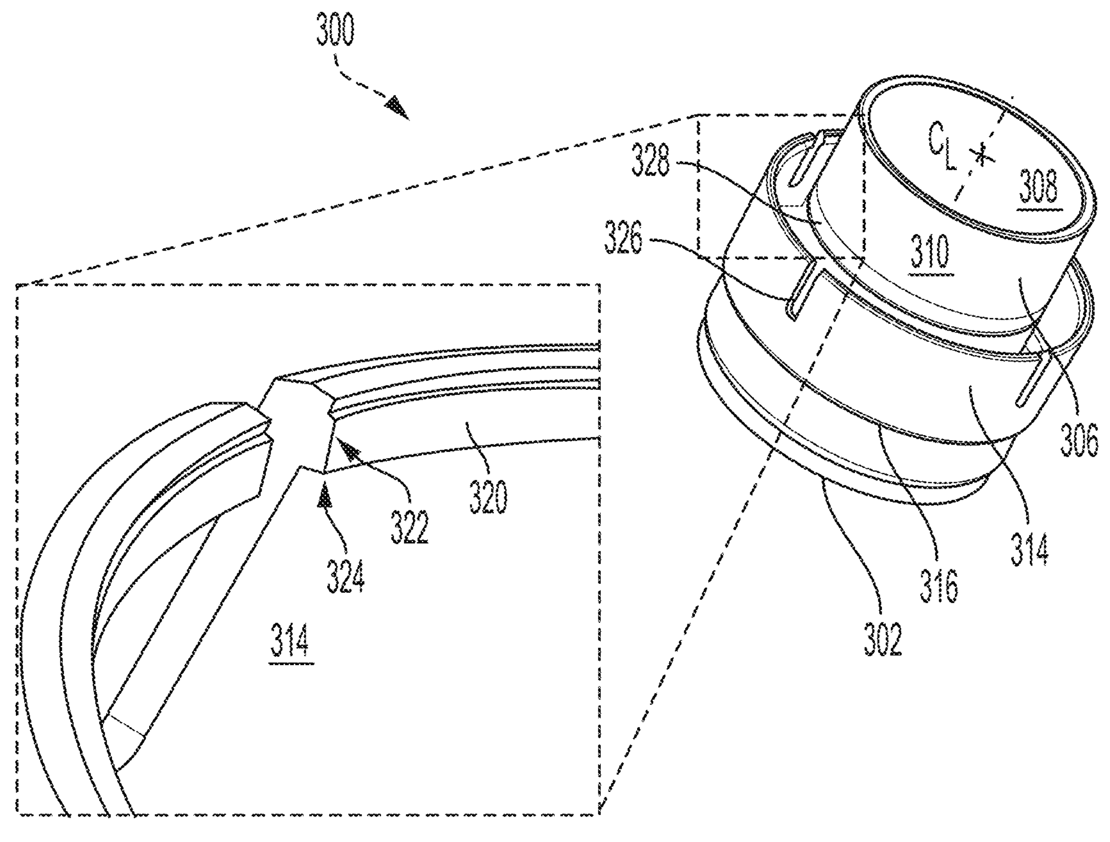
FIG. 3 is an outline view, including an enlarged detail, of an insert for a fitting in accordance with the disclosure.
Figure 4:
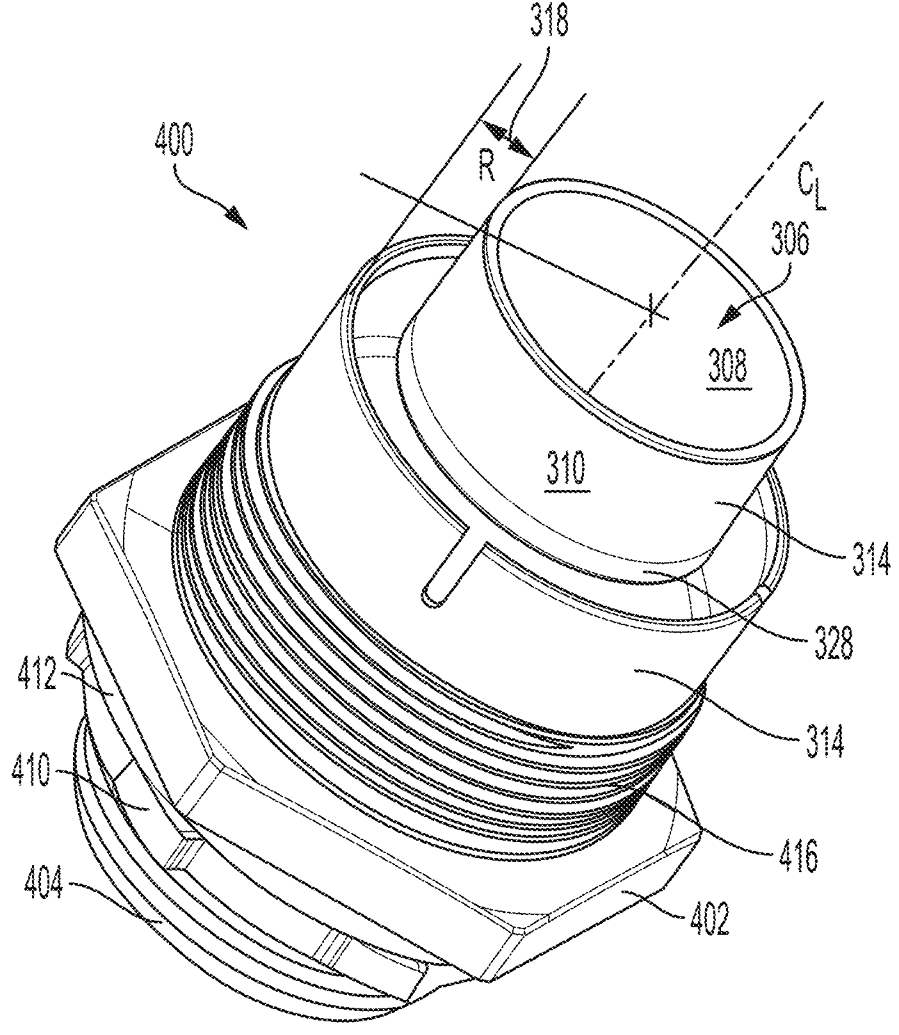
FIG. 4 is an outline view of a fitting for a Type A conduit in accordance with the disclosure.
Figure 5:
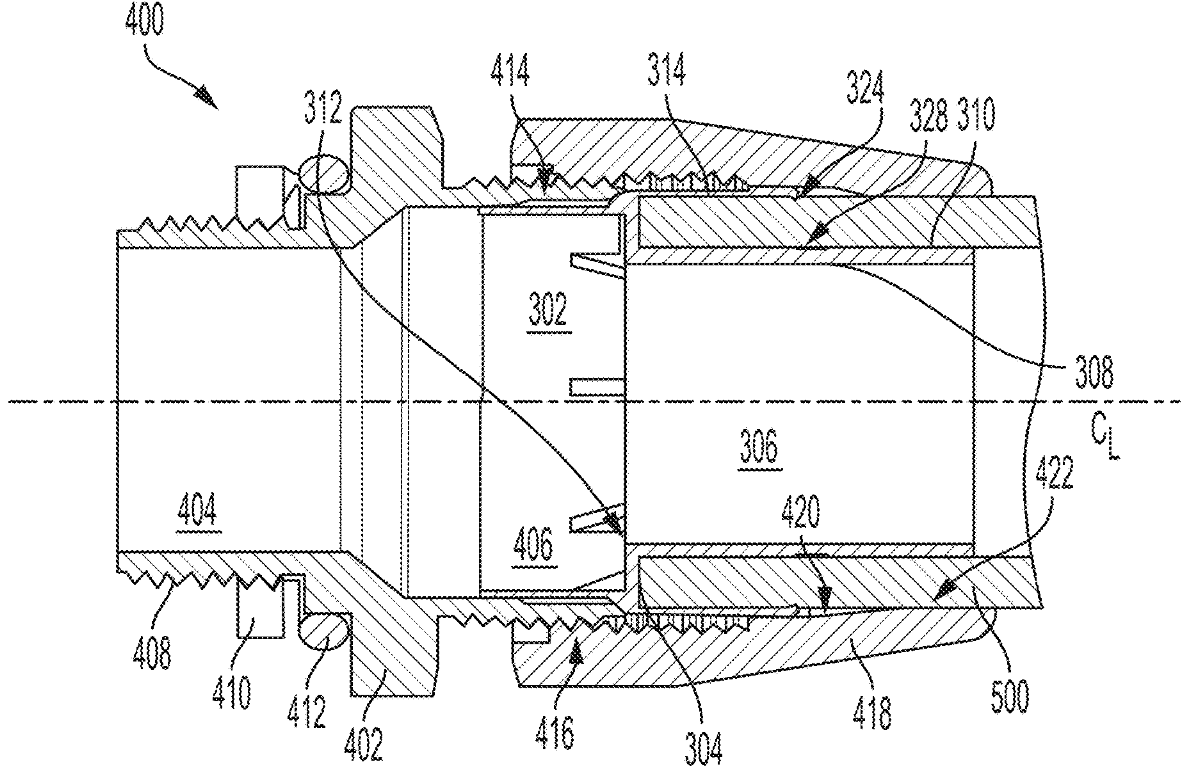
FIG. 5 is a cross section view of the fitting for Type A conduit of FIG. 4 in a first operating position in accordance with the disclosure.
Figure 6:
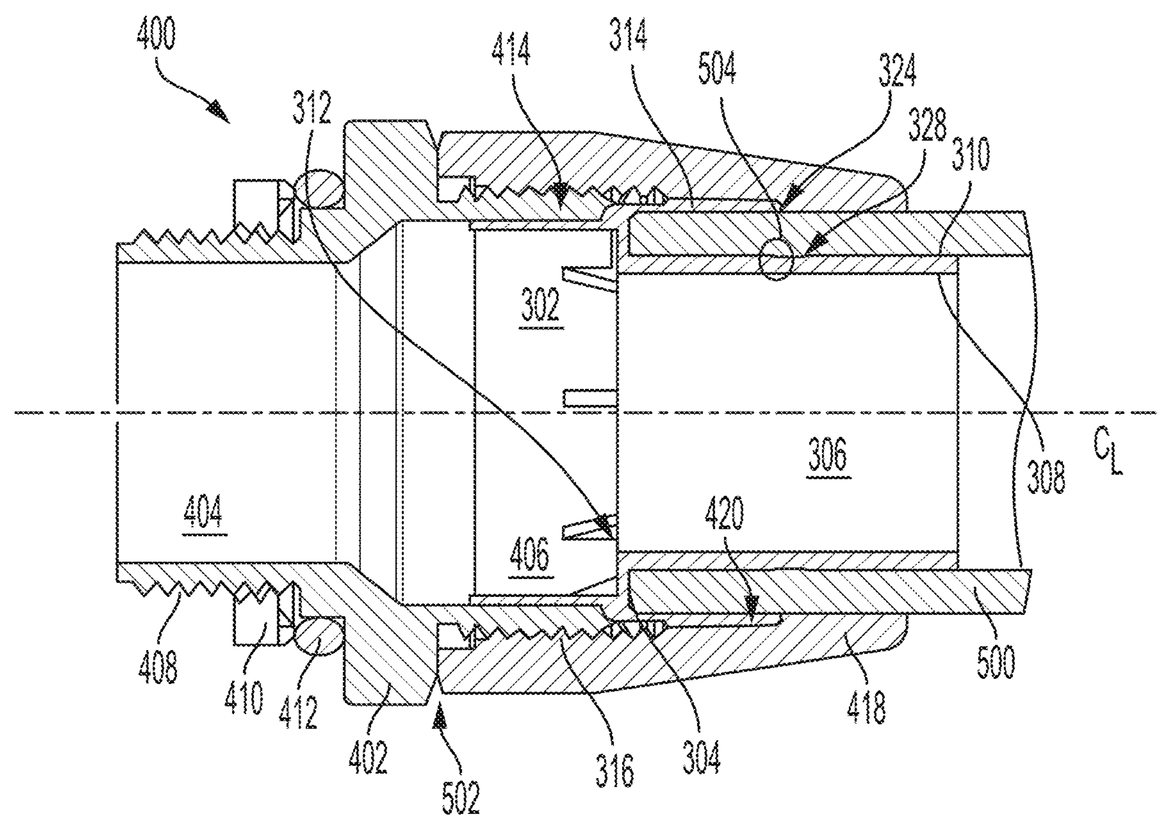
FIG. 6 is a cross section view of the fitting for Type A conduit of FIG. 4 in a second operating position in accordance with the disclosure.

A fitting 400 in accordance with the disclosure is shown in FIG. 4, and also in cross section in operating positions in FIG. 5 and in FIG. 6. An insert 300 of the fitting 400 is shown in FIG. 3 removed from the fitting to illustrate certain structural features thereof.

Figure 1:
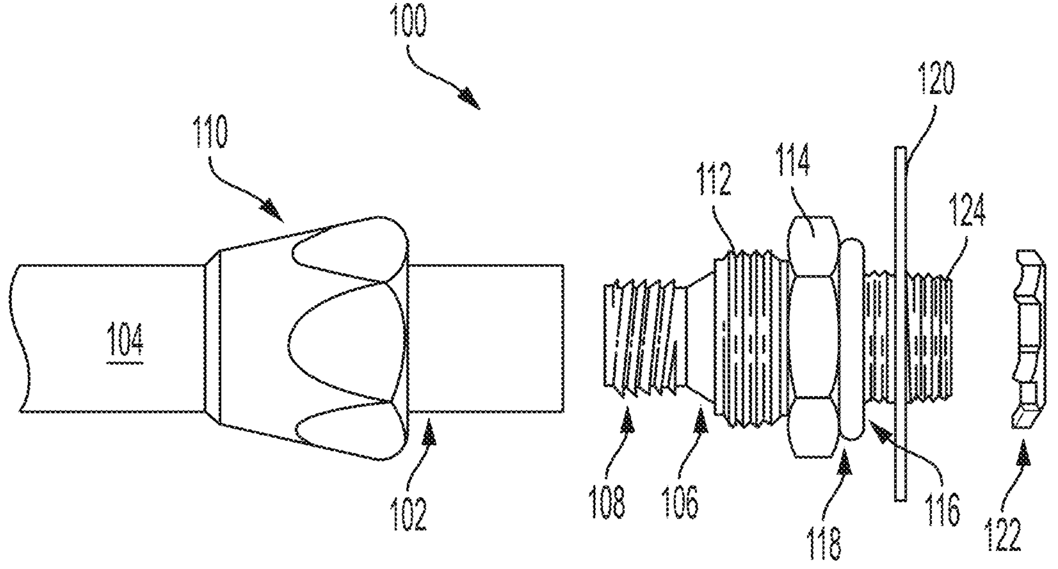

In reference to FIGS. 3-6, the fitting 400 includes a body 402 having a first end 404 and a second end 406. The first end 404 is threaded externally and has a threaded section 408 and configured to engage a nut 410 and a seal 412 to engage an enclosure (for example, wall 120 shown in FIG. 1). Although in the illustrated embodiment the fitting 400 has a threaded, first end 404, it may alternatively have a bend, or another type of end, for example, a splicing connection between conduit sections. Moreover, depending on the enclosure onto which the fitting 400 is mounted, the nut 410 may be omitted so the fitting 400 can be threaded directly into a threaded opening of the electrical housing, for example, a junction box having a thick wall with threaded fitting openings and the like. This installation is advantageously made possible with the removal of the requirement to thread the conduit onto the fitting as was previously the case, for example, threading the conduit 104 onto the thread section 108 of the known fitting type shown in FIG. 1. Pushing the conduit onto the fitting, as is the case with the fitting 400, enables the direct threaded engagement of the fitting with the housing onto which it will be installed.

In the illustrated embodiment, as best shown in FIG. 5 and FIG. 6, the second end 406 includes a cylindrical wall forming a bore 414 extending along a centerline axis CL. The bore 414 is formed on a radially inner side relative to the axis CL, and a threaded section 416 on a radially outer side.

An insert 300, shown removed from the fitting 400 in FIG. 3, is connected to the bore 414 of the second end 406 of the body 402. The insert 300 includes a body 302 forming an annular flange 304 (shown in FIGS. 5 and 6) disposed perpendicular relative to the centerline axis CL.

The insert 300 further includes a cylindrical section 306 having an inner surface 308 and an outer surface 310. The cylindrical section 306 is connected to the annular flange 304 and extends in a direction away from the second end 406 of the body 402 of the fitting 400 along an inner periphery 312 of the annular flange 304 and concentrically along the centerline axis CL.

Figures 2A, 2B:
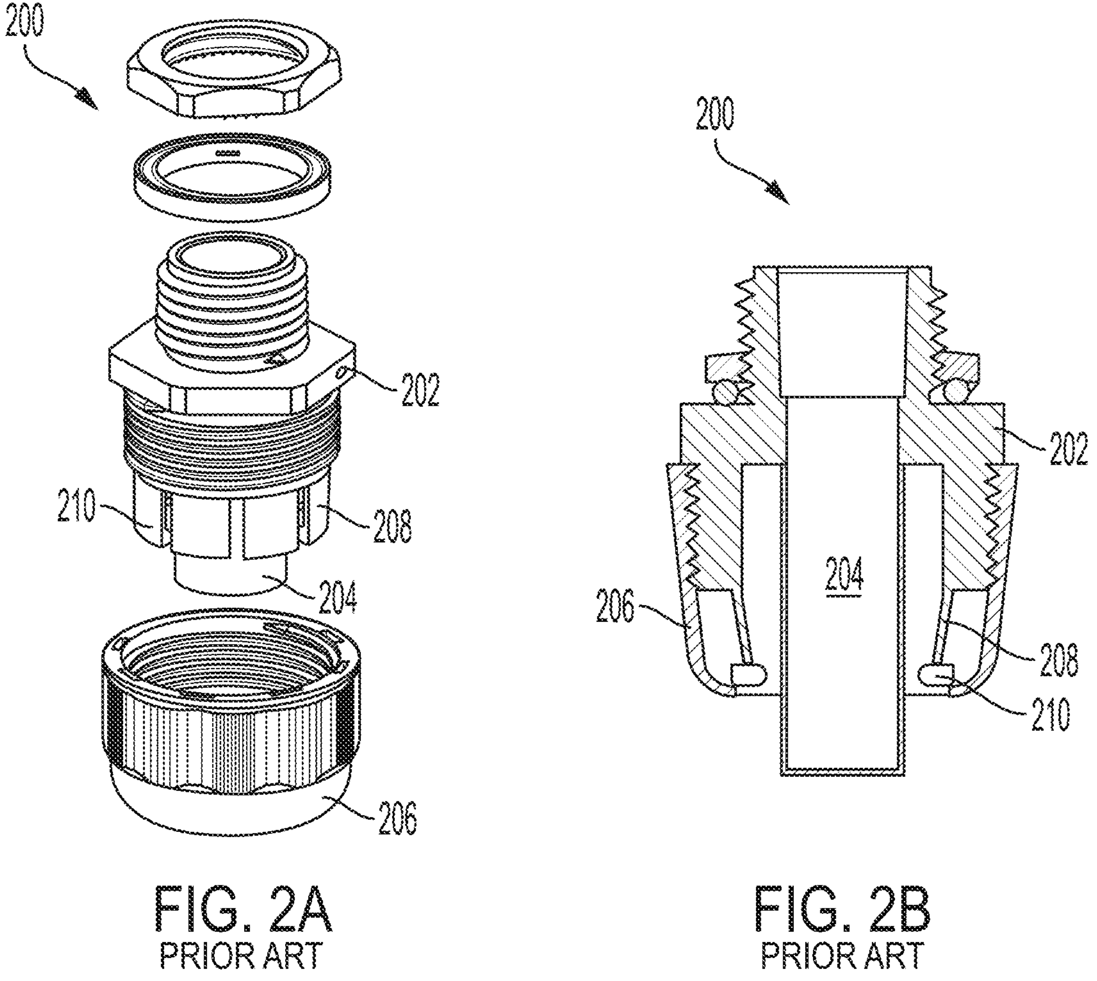

A plurality of fingers 314 is connected to the annular flange 304 and extends in a direction away from the second end 406 of the body 402 along an outer periphery 316 of the annular flange 304. The plurality of fingers 314 generally defines a cylindrical feature that extends generally in parallel to the cylindrical section 306 and at a radially offset distance, R, therefrom to define a radial gap 318 (see FIG. 4). Each finger of the plurality of fingers 314 includes a protrusion 320 at a distal end thereof, the protrusion 320 facing the cylindrical section 306 and extending into the radial gap 318. The protrusion 320 has a generally trapezoidal cross section shape that includes a first base that extends along the finger 314 in an axial direction, a second base 322 that defines a conical surface that converges towards the centerline in a direction towards the body 402 of the fitting, a first, small side on an outer side thereof, and a second, longer side on an inner side thereof that, together with the second base 322, forms a point 324 or a radially innermost edge extending into the radial gap 318. Slots 326 separate the fingers 314 from one another and permit the fingers 314 to bend radially inwardly during use. When the gland nut 418 is fully seated and abuts the body 402, the fingers 314 are pushed radially inwardly such that their ends are close to one another and/or touch, effectively closing the peripheral width or gap provided at the slots 326 to create a uniform pressure directed radially inwardly onto the conduit 400, as shown in FIG. 6. This is not possible with the clearance-fit of the gland nut onto the conduit in the known configuration shown in FIGS. 2*a* and 2*b*.

A channel 328 is formed in the outer surface 310 of the cylindrical section 306. The channel extends perpendicular to the centerline axis CL peripherally around the cylindrical section 306. In an axial direction, the channel 328 is axially aligned along the centerline CL with the protrusions 320 of the plurality of fingers 314.

A gland nut 418 is engageable on the threaded section 416 on the radially outer side of the body 402 of the fitting 400. The gland nut 418 includes an inner conical surface 420 that opens in the axial direction along the centerline CL towards the body 402 such that the inner conical surface converges radially as the gland nut 418 advances in threaded engagement with the threaded section 416. The inner conical surface 420 is configured to engage the plurality of fingers 314 as the gland nut 418 is threaded onto the threaded section 416, and to urge the distal ends of the plurality of fingers 314 towards the cylindrical section 306 as the gland nut 418 threadably advances towards the body 402.

The fitting 400 is shown in two operating positions in the cross sections of FIGS. 5 and 6. More specifically, in these views, an end of a conduit 500 is shown assembled onto the cylindrical section 306 such that an inner surface of the conduit mates and slides over the outer surface 310 of the cylindrical section 306 until a blunt end of the conduit 500 abuts the annular flange 304. The gland nut 418 is inserted onto the conduit 500 prior to assembly onto the fitting and is advanced to meet the threaded section 416, as shown in FIG. 5. For completing installation, the gland nut 418 is tightened either by hand or by use of a tool until its leading edge abuts against the body 402 of the fitting 400 at a location 502, as shown in FIG. 6. At this position, the plurality of fingers 314 has been bent inwardly in a radial direction relative to the centerline CL by the advancing inner conical surface 420, and the protrusions 320 have bitten into the outer surface of the conduit, forcing locally a portion of the conduit to overlap and enter the channel 328, thus creating a localized stress concentration zone that provides at least one water-tight interface 504. A second water-tight interface may also be created along an outer portion of the conduit 500 where the tips 324 of the protrusions 322 (see FIG. 3) dig into the conduit 500. These two water-tight interfaces also help resist pull-out forces tending to remove the conduit 500 from the fitting 400. It is noted that a trailing section of the gland nut 418 includes a closely fitting bore 422 (see FIG. 5) having a generally conical slope or draft angle that opens or faces away from the body 402 (towards the right in the orientation shown in FIG. 5), which helps constrain the conduit at around the area of the channel 328 when the gland nut 418 is fully tightened, as shown in FIG. 6. When a load is applied onto the conduit, to either pull the conduit away from the body 402 or to bend it by applying a torque about an axis perpendicular to the centerline, the insert 302 and conduit 500 may move by a few thousandths of a inch and allow the trailing section and bore 422 to jam the conduit 500 and help keep it engaged with the fitting 400. This is not possible with the known configuration shown in FIGS. 2*a* and 2*b*.

In the illustrated embodiment, the body 402 of the fitting 400 and also the body 302 of the insert 300 are made from plastic. The insert 300 is permanently installed into the body 402 of the fitting 400 using a press-fit operation, but other methods can also be used, for example, the formation of the two components in one monolithic structure, use of adhesives or a welding operation to connect the two components, and the like. As mentioned above, the fitting 400 may be embodied in a different configuration, for example, a splicing fitting for connecting two blunt ends of conduit together, a bend, and the like.

A combination and collaboration of features including the gland nut inner profile 420 (see FIG. 5), the length of travel of threads 416, the width of the gap 326 between the fingers 314, the thickness of the conduit 500 and the radial gap 318, and the position and dimensions of the groove 324, all contribute to providing conduit securement, liquid tightness and assembling the conduit without disassembly of the fitting.

Figure 7:
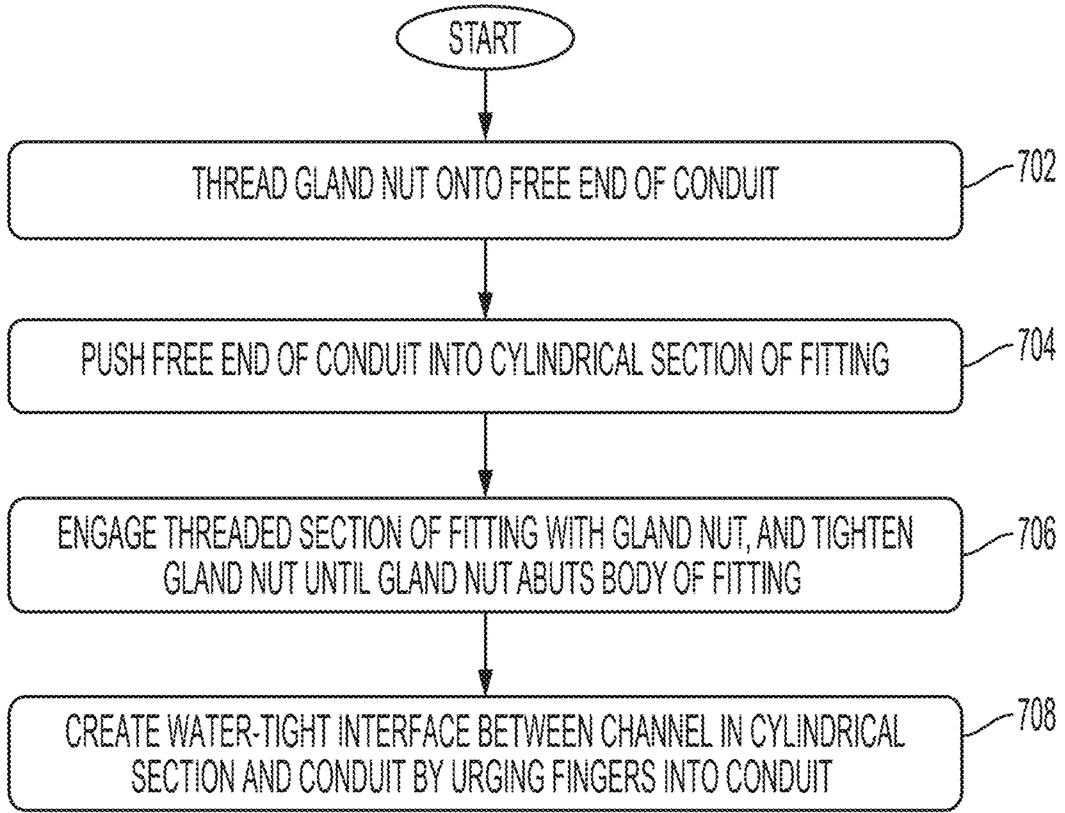
FIG. 7 is a flowchart for a method in accordance with the disclosure.

A flowchart for a method of attaching a free end of a liquid-tight flexible nonmetallic conduit (LFNC) Type A to a fitting is shown in FIG. 7. The method includes threading a gland nut onto the free end of the conduit at 702, pushing the free end of the conduit into a cylindrical section of the fitting until the free end of the conduit abuts an annular flange in 704, engaging a threaded section of the fitting with the gland nut, and tightening the gland nut until the gland nut abuts a body of the fitting at 706. Advantageously, tightening the gland nut creates a water-tight interface between a channel in the cylindrical section and the conduit as fingers of the fitting are urged and bite into the conduit axially at the channel at 708. It is worth noting that the fitting may remain connected to an electrical box, enclosure, junction and the like during connection and disconnection of the conduit.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fitting for liquid-tight flexible nonmetallic conduit (LFNC) Type A, comprising:
   - a body having an axis and including:
     - a threaded section;
     - an annular flange disposed perpendicular relative to the axis;
     - a cylindrical section having an inner surface and an outer surface, the cylindrical section being connected to the annular flange and extending directionally away from the body along an inner periphery of the annular flange;
     - a plurality of fingers connected to the annular flange and extending in a direction away from the body along an outer periphery of the annular flange, the plurality of fingers generally defining a cylindrical feature that extends generally in parallel to the cylindrical section and at a radially offset distance therefrom to define a radial gap;
   - wherein each finger of the plurality of fingers includes a protrusion at a distal end thereof, the protrusion facing the cylindrical section and extending into the radial gap;
   - wherein the protrusion has a generally trapezoidal cross section shape that includes a first base that extends along the finger, a second base that defines a conical surface that converges towards the axis in a direction towards the body, a first small side on an outer side thereof, and a second longer side on an inner side thereof that, together with the second base, forms a radially innermost edge extending into the radial gap; and
   - wherein a channel is formed in the outer surface of the cylindrical section, the channel extending perpendicular to the axis peripherally around the cylindrical section, the channel being axially aligned with the protrusions of the plurality of fingers in an axial direction; and
   - a gland nut being engageable on the threaded section of the body, the gland nut including an inner conical surface that opens in the axial direction towards the body;
   - wherein the inner conical surface is configured to engage the plurality of fingers as the gland nut is threaded onto the threaded section, and to urge the distal ends of the plurality of fingers towards the channel of the cylindrical section as the gland nut threadably advances towards the body; and
   - wherein a section of conduit is adapted to occupy the radial gap and abut the annular flange such that, when the plurality of fingers is urged towards the cylindrical section, the protrusions bite into an outer surface of the conduit and urge a portion of an inner surface of the conduit to enter the channel and create a water-tight interface.

2. The fitting of claim 1, wherein the body has a first end and a second end, the second end forming the cylindrical section.

3. The fitting of claim 2, wherein the first end of the body includes a threaded portion.

4. The fitting of claim 1, wherein an insert is connected to the body adjacent the threaded section onto which the gland nut is engageable, the insert including the annular flange and the plurality of fingers.

5. The fitting of claim 1, wherein the gland nut includes a trailing section forming a close-fitting bore that is adapted to slidably engage the conduit and that has a generally conical draft angle that opens axially in a direction towards the body.

6. The fitting of claim 1, wherein the cylindrical section extends concentrically along the axis.

7. The fitting of claim 1, wherein slots separate the fingers from one another and permit the fingers to bend radially inwardly when urged.

8. A method for connecting a free end of a liquid-tight flexible nonmetallic conduit (LFNC) Type A to a fitting, comprising:
   - providing a body having an axis and including:
     - a threaded section;
     - an annular flange disposed perpendicular relative to the axis;
     - a cylindrical section having an inner surface and an outer surface, the cylindrical section being connected to the annular flange and extending directionally away from the body along an inner periphery of the annular flange;
     - a plurality of fingers connected to the annular flange and extending in a direction away from the body along an outer periphery of the annular flange, the plurality of fingers generally defining a cylindrical feature that extends generally in parallel to the cylindrical section and at a radially offset distance therefrom to define a radial gap;
   - wherein each finger of the plurality of fingers includes a protrusion at a distal end thereof, the protrusion facing the cylindrical section and extending into the radial gap;
   - wherein the protrusion has a generally trapezoidal cross section shape that includes a first base that extends along the finger, a second base that defines a conical surface that converges towards the axis in a direction towards the body, a first small side on an outer side thereof, and a second longer side on an inner side thereof that, together with the second base, forms a radially innermost edge extending into the radial gap;
   - wherein a channel is formed in the outer surface of the cylindrical section, the channel extending perpendicular to the axis peripherally around the cylindrical section, the channel being axially aligned with the protrusions of the plurality of fingers in an axial direction;
   - providing a gland nut onto the conduit, the gland nut being is engageable on the threaded section of the body, the gland nut including an inner conical surface that opens in the axial direction towards the body;

wherein the inner conical surface is configured to engage the plurality of fingers as the gland nut is threaded onto the threaded section, and to urge the distal ends of the plurality of fingers towards the channel of the cylindrical section as the gland nut threadably advances towards the body;

wherein a section of conduit is adapted to occupy the radial gap and abut the annular flange such that, when the plurality of fingers is urged towards the cylindrical section, the protrusions bite into an outer surface of the conduit and urge a portion of an inner surface of the conduit to enter the channel and create a water-tight interface;

pushing an end of the conduit onto the cylindrical section until the end of the conduit abuts the annular flange; and threading the gland nut onto the threaded section of the body until the gland nut abuts the body.

9. The method of claim 8, wherein the body has a first end and a second end, the second end forming the cylindrical section.

10. The method of claim 9, wherein the first end of the body includes a threaded portion for engaging a nut, the nut configured to connect the body to an electrical enclosure.

11. The method of claim 8, wherein the body is a two-piece construction that includes an insert connected to the body adjacent the threaded section onto which the gland nut is engageable, the insert including the annular flange and the plurality of fingers.

12. The method of claim 8, wherein the cylindrical section extends concentrically along the axis.

13. The method of claim 8, wherein slots separate the fingers from one another and permit the fingers to bend radially inwardly when urged.

* * * * *